United States Patent [19]
Combs

[11] Patent Number: 5,952,261
[45] Date of Patent: Sep. 14, 1999

[54] DOUBLE METAL CYANIDE COMPLEX CATALYSTS MODIFIED WITH GROUP IIA COMPOUNDS

[75] Inventor: George Combs, Downingtown, Pa.

[73] Assignee: Arco Chemical Technology, L.P., Greenville, Del.

[21] Appl. No.: 09/045,584

[22] Filed: Mar. 20, 1998

[51] Int. Cl.[6] ..................................... B01J 27/26
[52] U.S. Cl. .......................... 502/175; 502/172; 502/175; 502/183; 502/307; 502/326; 502/340; 502/200
[58] Field of Search ................... 502/172, 175, 502/183, 307, 326, 340, 200

[56] References Cited

U.S. PATENT DOCUMENTS

| | | | |
|---|---|---|---|
| 3,278,459 | 10/1966 | Herold | 260/2 |
| 3,404,109 | 10/1968 | Milgrom | 260/611 |
| 3,427,334 | 2/1969 | Behner | 260/429 |
| 3,427,335 | 2/1969 | Herold | 260/429 |
| 3,829,505 | 8/1974 | Herold | 260/611 |
| 3,900,518 | 8/1975 | Milgrom | 260/573 |
| 4,355,188 | 10/1982 | Herold | 568/620 |
| 4,472,560 | 9/1984 | Kuyper et al. | 526/120 |
| 5,158,922 | 10/1992 | Hinney et al. | 502/175 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,627,120 | 5/1997 | Le-Khac | 502/156 |
| 5,627,122 | 5/1997 | Le-Khac | 502/175 |
| 5,714,428 | 2/1998 | Le-Khac | 502/159 |

OTHER PUBLICATIONS

Schuchardt et al., "Preparation of High Molecular Weight Polyols Using Double Metal Cyanide Catalysts," 32nd Annual Polyurethane Technical Marketing Conference, Oct. 1–4, 1989, pp. 360–364.

Herold et al., "Hexacyanomeltalate Salt Complexes as Catalysts for Epoxide Polymerizations," Advances in Chemistry Series, No. 128, Polymerization Kinetics and Technology, 1973, pp. 208–229.

Livigni et al., "Poly (Propylene Ether) Polyols Prepared With a Zinc Hexacyanocobaltate Complex Catalyst," ACS Symposium Series, No. 6, Polyethers, 1975, pp. 20–37.

*Primary Examiner*—Deborah Jones
*Assistant Examiner*—Holly C. Shaw
*Attorney, Agent, or Firm*—Stephen D. Harper

[57] ABSTRACT

Highly active double metal cyanide complex catalysts useful for epoxide polymerization are prepared by reacting zinc chloride or other metal salt with potassium hexacyanocobaltate or other metal cyanide salt in the presence of a Group IIA compound such as calcium chloride.

20 Claims, No Drawings

DOUBLE METAL CYANIDE COMPLEX CATALYSTS MODIFIED WITH GROUP IIA COMPOUNDS

FIELD OF INVENTION

This invention relates to double metal cyanide complex catalysts which are modified by the incorporation of a cyanide-free Group IIA compound such as calcium chloride as well as to methods for the preparation of such catalysts. Epoxides may be polymerized using these modified catalysts to provide polyether polyols having low levels of unsaturation and/or high molecular weights.

BACKGROUND OF THE INVENTION

Double metal cyanide complex catalysts are known to be extremely useful and active catalysts for the ring-opening polymerization of heterocyclic monomers such as epoxides. In particular, catalysts of this type have been employed to prepare polyether polyols derived from propylene oxide as described, for example, in U.S. Pat. Nos. 3,404,109, 3,829,505, 3,900,518, 3,941,849, 4,355,188, 5,032,671, and 4,472,560. Double metal cyanide complex catalysts are generally recognized as superior to the caustic catalysts traditionally used to produce polyether polyols for utilization in polyurethane foams, coatings, adhesives, sealants, and elastomers due to the reduced levels of unsaturation and higher functionality of the polyols obtained using such catalysts, as described in U.S. Pat. Nos. 4,239,879, 4,242,490, and 4,985,491.

The double metal cyanide complex catalysts are generally prepared by reacting a metal salt such as zinc chloride with an alkali metal hexacyanometallate such as potassium hexacyanocobaltate in aqueous solution.

Workers in the field have generally believed that to obtain a double metal cyanide complex catalyst having satisfactory performance in epoxide polymerization it is necessary to use an amount of the metal salt which is greater than that required to completely react the alkali metal hexacyanometallate. For example, U.S. Pat. No. 5,158,922 (Hinney et al.), states the "[t]o obtain a double metal cyanide complex catalyst having reproducibly high polymerization activity, it is critical that an excess of the water-soluble metal salt be employed relative to the amount of metal cyanide salt." According to this reference, a portion of the excess metal salt is retained in the catalyst upon isolation and appears to function as a promoter or co-catalyst. Later, as described in U.S. Pat. No. 5,627,122, it was found that catalysts containing a relatively small excess of metal salt, particularly those prepared using an alcohol such as tert-butyl alcohol as an organic complexing agent, offered certain advantages over catalysts containing a larger excess of metal salt. However, the metal salt still must be present in excess during the catalyst synthesis since double metal cyanide complex substances that contain no metal salt "are inactive as epoxide polymerization catalysts."

While there has been considerable interest in further improving the performance of double metal cyanide complex catalysts by changing the identity of the organic complexing agent (see, for example, U.S. Pat. No. 5,470,813) or by modifying the catalyst with a polyether (see, for example, U.S. Pat. No. 5,482,908) or zinc sulfate and/or acid (see, for example U.S. Pat. No. 4,472,560), the preparation of such catalysts using cyanide-free compounds of Group IIA elements such as calcium chloride has not heretofore been described.

SUMMARY OF INVENTION

This invention provides a double metal cyanide complex catalyst comprised of double metal cyanide and an organic complexing agent, wherein said double metal cyanide complex catalyst is modified with a Group IIA compound which is free of cyanide. Additionally, this invention provides a method of making a double metal cyanide complex catalyst comprising reacting a zinc salt with a metal cyanide salt in the presence of a Group IIA compound which is free of cyanide.

The Group IIA compound must contain at least one element selected from Group IIA of the Periodic Table, is preferably water soluble and is characterized by the absence of cyanide. Thus, for example, alkaline earth metal hexacyanometallates are not suitable for use as the Group IIA compound component of this invention; such substances may, however, be utilized as the metal cyanide salt starting material in the methods for synthesizing the modified double metal cyanide complex catalysts described herein. The Group IIA compound may contain one or more of the Group IIA elements. Calcium is the most preferred Group IIA element. The identity of the portion of the Group IIA compound other than the Group IIA element is not thought to be critical and may be, for example, halide (e.g., chloride), nitrate, sulfate, hydroxide or the like. For convenience, as will be evident from the later discussion related to synthesis methods, the Group IIA compound will preferably be at least somewhat soluble in water or mixtures of water and the organic complexing agent. Calcium chloride is a particularly preferred Group IIA compound for use in the present invention. Combinations of Group IIA compounds may be used to advantage if so desired such as, for example, calcium chloride and calcium oxide.

The synthesis of the modified double metal cyanide complex catalysts of this invention may be effected by reacting a metal salt with a metal cyanide salt in the presence of the Group IIA compound.

The metal salt has the general empirical formula $M^1(X)_n$, wherein $M^1$ is selected from the group consisting of Zn(II), Fe(II), Ni(II), Mn(II), Co(II), Sn(II), Pb(II), Fe(III), Mo(Iv), Mo(VI), Al(III), V(IV), Sr(II), W(VI), Cu(II), and Cr(III). Preferably $M^1$ is either Zn(II), Fe(II), Co(II), or Ni(II), as double metal cyanide complex catalysts containing these metals tend to have the highest polymerization activity and yield polymeric products having relatively low polydispersity. Most preferably, $M^1$ is Zn(II). The metal salt preferably has a solubility in water at 25° C. of at least about 10 g per 100 g water. Mixtures of different water-soluble metal salts may be employed if desired. X is an anion selected from the group consisting of halide (e.g., fluoride, chloride, bromide, iodide), hydroxide (OH), sulphate ($SO_4$), carbonate ($CO_3$, $CO_3H$), cyanide (CN), thiocyanate (SCN), isocyanate (NCO), isothiocyanate (NCS), carboxylate (e.g., acetate, propionate), oxalate, or nitrate ($NO_3$). The value of n is selected to satisfy the valency state of $M^1$ and typically is 1, 2, or 3. The zinc halides, particularly zinc chloride, are particular preferred for use; zinc sulfate and zinc nitrate are specific examples of other suitable metal salts.

The metal cyanide salt preferably is water—soluble as well and has the general formula $(Y)_a M^2(CN)_b(A)_c$ wherein $M_2$ is the same as or different from $M^1$ and is selected from the group consisting of Fe(II), Fe(III), Co(III), Cr(III), Mn(II), Mn(III), Ir(III), Rh(III), Ru(II), V(IV), V(V), Co(II), and Cr(II). Preferably $M^2$ is either Co(II), Co(III), Fe(II), Fe(III), Cr(III), Ir(III), or Ni(II) as catalysts containing these metals tend to have the highest polymerization activity and to yield polyether polyols having desirably narrow molecular weight distributions (e.g., low polydispersity). Most preferably $M^2$ is Co(II). More than one metal may be present in the metal cyanide salt, e.g., potassium hexacyanocobaltate (II) ferrate (II). Mixtures of different water-soluble metal cyanide salts may be employed, if desired. Y is an alkali metal (e.g., Li, Na, K) or alkaline earth metal (e.g., Ca, Ba). A is a second anion that may be the same as or different from X in the metal salt and may be selected from the group consisting of halide, hydroxide, sulfate, and the like. Both a and b are integers of 1 or greater, wherein a, b, and c are selected so as to provide the overall electroneutrality of the metal cyanide salt. Preferably, c is 0. In most instances, b corresponds to the coordination number of $M^2$ and is usually 6. Examples of suitable water-soluble metal cyanide salts useable in the process of this invention include, but are not limited to, potassium hexacyanocobaltate (III) (the preferred metal cyanide salt), potassium hexacyanoferrate (ii), potassium hexacyanoferrate (III), potassium hexacyanocobalte (II) ferrate (II), sodium hexacyanocobaltate (III), sodium hexacyanoferrate (II), sodium hexacyanoferrate (III), potassium hexacyanoruthenate (II), calcium hexacyanocobaltate (III), potassium tetracyanonickelate (II), potassium hexacyanochromate (III), potassium hexacyanoiridate (III), calcium hexacyanoferrate (II), potassium hexacyanocobaltate (II), calcium hexacyanoferrate (III), and lithium hexacyanocobaltate (III).

Although a stoichiometric excess of the metal salt relative to the metal cyanide salt could be utilized if so desired, a distinguishing feature of this invention is that double metal cyanide complex catalysts which have high epoxide polymerization activity and are capable of providing polyether polyols of low polydispersity and low unsaturation may be prepared using a stoichiometric amount of metal salt or less. When zinc chloride is the metal salt and potassium hexayanocobaltate is the metal cyanide salt, for example, the molar ratio of zinc chloride: potassium hexacycanocobaltate may be about 1.5:1 or lower (with the ratio of 1:1 being the preferred lower limit) since the stoichiometric reaction of these reagents requires a 1.5:1 molar ratio. This was quite surprising in view of the widely held belief in the prior art that at least a minor excess of the metal salt was required in order to attain satisfactory catalyst performance.

While the precise method by which the metal salt and the metal cyanide salt are reacted is not believed to be critical, it is important that the Group IIA compound be present during such reaction in order to favor incorporation of the Group IIA compound into the double metal cyanide complex catalyst which forms. Typically, it will be convenient to combine separate aqueous solutions of the metal salt and the metal cyanide salt with the Group IIA compound being additionally present in one or both of the aqueous solutions.

The reactants are combined at any desired temperature. Preferably, the catalyst is prepared at a temperature within the range of about room temperature to about 80° C.; a more preferred range is from 35° C. to about 60° C. Generally speaking, the double metal cyanide complex catalyst which is formed precipitates from solution in particulate form.

The organic complexing agent and optional functionalized polymer (both to be described later in more detail) can be included with either or both of the aqueous solutions, or they can be added to the catalyst slurry immediately following precipitation of the double metal cyanide complex. It is generally preferred to pre-mix the complexing agent with either aqueous solution, or both, before combining the reactants. If the complexing agent is added to the catalyst precipitate instead, then the reaction mixture should be mixed efficiently with a homogenizer or a high-shear stirrer to produce the most active form of the catalyst. It is generally preferred to add functionalized polymer following precipitation of the double metal cyanide complex catalysts.

The catalyst is then usually isolated from the catalyst slurry by any convenient means, such as filtration, centrifugation, decanting, or the like.

The isolated catalyst is preferably washed with an aqueous solution that contains additional organic complexing agent and/or additional functionalized polymer. After the catalyst has been washed, it is usually preferred to dry it under vacuum until the catalyst reaches a constant weight.

Double metal cyanide complex catalysts made by the process of the invention include an organic complexing agent. Generally, the complexing agent is soluble in water. Suitable complexing agents are those commonly known in the art, as taught, for example, in U.S. Pat. No. 5,158,922. The complexing agent may be added either during preparation or immediately following precipitation of the catalysts. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitriles, sulfides, and mixtures thereof. Preferred complexing agents are water-soluble aliphatic alcohols, particularly those selected from the group consisting of ethanol, isopropyl alcohol, n-butyl alcohol, isobutyl alcohol, sec-butyl alcohol, and tert-butyl alcohol. Tert-butyl alcohol is most preferred. Another class of preferred organic complexing agents includes the water-soluble mono and di-alkyl ethers of glycols and glycol oligomers such as, for example, glyme, diglyme, and the like.

Catalysts made by the process of the invention optionally include a functionalized polymer or its water-soluble salt. By "functionalized polymer" we mean a polymer that contains one or more functional groups containing oxygen, nitrogen, sulfur, phosphorus, or halogen, wherein the polymer, or a water-soluble salt derived from it, has relatively good water solubility, i.e., at least about 3 wt.% of the polymer or its salt dissolves at room temperature in water or mixtures of water with a water-miscible organic solvent. Examples of water-miscible organic solvents are tetrahydrofuran, acetone, acetonitrile, t-butyl alcohol, and the like. Water solubility is helpful for convenient incorporation of the functionalized polymer into the catalyst structure during formation and precipitation of the double metal cyanide compound.

Functionalized polymers may have the general structure:

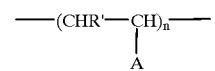

in which R' is hydrogen, —COOH, or a $C_1$–$C_5$ alkyl group, and A is one or more functional groups selected from the group consisting of —OH, —$NH_2$, —NHR, —$NR_2$, —SH, —SR, —COR, —CN, —Cl, —Br, —$C_6H_4$—OH, —$C_6H_4$—$C(CH_3)_2$OH, —$CONH_2$, —CONHR, —CO—$NR_2$, —OR, —$NO_2$, —NHCOR, —NRCOR, —COOH, —COOR, —CHO, —OCOR, —COO——OH, —$SO_3H$, —CONH—R—SOH, pyridinyl, and pyrrolidonyl, in which R is a $C_1$–$C_5$ alkyl or alkylene group, and wherein n has a value within the range of about 5 to about 5,000.

Optionally, the functionalized polymer also includes recurring units derived from a non-functionalized vinyl monomer such as an olefin or diene, e.g., ethylene, propylene, butylenes, butadiene, isoprene, styrene, or the like, provided that the polymer or a salt derived from it has relatively good solubility in water or mixtures of water and a water-miscible organic solvent.

Suitable functionalized polymers include, for example, poly(acrylamide), poly(acrylamide-co-acrylic acid), poly(acrylic acid), poly(2-acrylamide-2-methyl-a-propanesulfonic acid), poly(acrylic acid-co-maleic acid), poly(acrylonitrile), poly(alkyl acrylate)s, poly(alkyl methacrylate)s, poly(vinyl methyl ether), poly(vinyl ethyl ether), poly(vinyl acetate), poly(vinyl alcohol), poly(N-vinylpyrrolidone), poly(N-vinylpyrrolidone-co-acrylic acid), poly(N,N-dimethylacrylamide), poly(vinyl methyl ketone), poly(4-vinylphenol), poly(4-vinylpyridine), poly(vinyl chloride), poly(acrylic acid-co-styrene), poly(vinyl sulfate), poly(vinyl sulfate) sodium salt, and the like.

Suitable functionalized polymers also include polyethers. Catalysts that incorporate a polyether are taught in U.S. Pat. Nos. 5,482,908 and 5,545,601, the teachings of which are incorporated herein by reference in their entirety. In one preferred embodiment of the invention, the functionalized polymer is a polyether polyol. Preferably, the polyether polyol has a number average molecular weight in excess of 500. Polypropylene glycols having a functionality of 2 or 3 are especially useful for this purpose.

The catalyst obtained by the process of this invention may be used in any of the polymerization reactions known in the art wherein double metal cyanide complex catalysts have been employed. The catalysts are particularly suitable for use in catalyzing the polymerization of epoxides such as propylene oxide onto active hydrogen-containing initiators (telogens) to yield polyether polyols. Such reactions are described, for example, in U.S. Pat. Nos. 3,427,256, 3,427,334, 3,427,335, 3,301,796, 3,442,876, 3,278,457, 3,278,458, 3,279,459, 3,404,109, 3,829,505, 3,900,518, 3,941,849, 4,355,188, 3,538,043, 3,576,909, 4,279,798, 5,032,671, 3,726,840, and 4,472,560 as well as EP 222,453, and East German Pat. Nos. 148,957, 203,734, and 203,735, the teachings of which are incorporated herein by reference in their entirety.

The precise chemical structures and compositions of double metal cyanide complex catalysts obtained by practice of this invention are not known, although by elemental analysis it appears that the Group IIA compound is incorporated in some form into the catalyst. Some reaction of the Group IIA compound with the other inorganic starting materials used in the process may also be taking place. Typically, the composition of the catalyst will be such that the Group IIA content (calculated as the element) will be in the range of from about 0.1 to 10 weight percent. Certain amounts of organic complexing agent, functionalized polymer, and water, will generally also be present in addition to the double metal cyanide itself, wherein the relative proportions of these components are typically similar to those found in double metal cyanide complex catalysts described in the prior art (including the patents referenced herein). As discussed earlier, variable amounts of metal salt (e.g., zinc chloride) may also be present.

Without further elaboration, it is believed that one skilled in the art can, using the preceding description, utilize the present invention to its fullest extent. The following examples therefore, are to be considered as merely illustrative and not limitative of the claims or remainder of the disclosure in any way whatsoever.

EXAMPLES

The relative activity of each of the double metal cyanide complex catalysts described herein was evaluated by calculation of an apparent rate constant ($K_{app}$) for propylene oxide polymerization. The method used for the calculation involves monitoring the drop in propylene oxide partial pressure during the cookout or soak period of a batch polymerization run (i.e., the period after incremental propylene oxide addition to the reaction mixture has been completed) and assumes that there is rapid equilibration of the unreacted propylene oxide between the liquid and vapor phases relative to polymerization. When the natural logarithm of the propylene oxide concentration (partial pressure) is plotted as a function of time, a straight line is obtained. This indicates the propylene oxide consumption is first order with respect to propylene oxide concentration. The slope of the straight line is the apparent rate constant $K_{app}$, which should be related to the time rate constant K by the equation $K_{app}=K[cat^*]^n$. The expression cat* represents the actual concentration of active catalyst centers, which may not be equal to the catalyst concentration.

Example 1

This example demonstrates the preparation of a calcium chloride-modified zinc hexacyanocobaltate complex catalyst in accordance with the invention.

A 3 L kettle equipped with baffles, impeller and heating mantle is charged with 472.77 g deionized water. The agitation rate of the impeller is set at 150 rpm. Calcium chloride dihydrate (163.74 g) obtained from Aldrich Chemical Company (98+% purity) is added, followed by 230.23 deionized water to wash the kettle walls free of any residual calcium chloride dihydrate. Zinc chloride (9.24 g) obtained from Aldrich Chemical Company (98+% purity) is then added and the kettle walls washed again with 346.02 g deionized water. After raising the agitation rate to 200 rpm, 165.45 g tert-butyl alcohol is added to the kettle.

The following mixture is prepared separately. A 1 L glass beaker is charged with 193.4 g deionized water. While the contents of the beaker are gently mixed using a poly(perfluoroethylene) coated stir bar, 160.0 g calcium chloride dihydrate is added causing the temperature of the water to increase to 47° C. While heating to 50–60° C., 0.3007 g calcium oxide (Aldrich, 99.9%) is added. The mixture is stirred for 80 minutes while cooling to 31° C. Thereafter, 232.2 g deionized water and 14.80 g potassium hexacyanocobaltate are added to yield a clear slightly yellow mixture.

The contents of the 3 L kettle are heated to 50° C. and agitated at a rate of 400 rpm. Addition of the potassium hexacyanocobaltate solution to the kettle is commenced using a syringe pump at a rate of ca. 5 g/min. After addition is completed, mixing of the kettle contents is continued for another 20 minutes.

In a plastic beaker containing a poly(perfluoroethylene) coated stir bar, a solution of 15.80 g 1000 molecular weight polypropylene glycol diol, 4.00 g tert-butyl alcohol and 62.00 g deionized water is prepared. After stirring vigorously for 3 minutes, this solution is added to the contents of the kettle. After stirring briefly, the contents of the kettle are transferred to a pressure filter having 5 micron filter paper and filtered at 20 psig. The solids removed from the filter (90.6 g) are resuspended in a premixed solution of 101 g tert-butyl alcohol and 55 g deionized water and mixed for about 10 minutes before placing the resulting suspension in a 1 L round bottom flask. The suspension is heated to 50° C. and mixing continued for another 60 minutes thereafter before adding 2.05 g of the 1000 molecular weight polypropylene glycol diol. After mixing for another 3 minutes, the mixture is press-filtered at 20 psig for 3 minutes yielding 63.6 g colorless slightly pasty solids. The solids are re-suspended in 144.0 g tert-butyl alcohol, mixed for 10 minutes and heated at 50° C. for 60 minutes before adding 1.01 g of the polypropylene glycol diol to the suspension. After stirring briefly, the suspension is filtered through 5 micron filter paper to provide 44.7 g of wet solids. The calcium chloride-modified zinc hexacyanocobaltate complex catalyst (12.8 g) is obtained in final form by drying the wet solids 35 hours in a 55° C. vacuum oven.

The catalyst by elemental analysis contains 18.7 wt. % Zn, 8.80 wt. % Co, 10.9 wt. % Cl, and 4.47 wt. % Ca.

Example 2

This example demonstrates an alternative method of preparing a calcium chloride-modified zinc hexacyanocobaltate complex catalyst in accordance with the invention.

A 3 L kettle equipped with baffles, impeller and heating mantle is charged with 638.0 g deionized water. The agitation rate of the impeller is set at 150 rpm. Calcium chloride dihydrate (163.7g) is added, followed by 65 g deionized water to wash the kettle walls free of any residual calcium chloride dihydrate. Zinc chloride (9.27 g) is then added and the kettle walls washed again with 346 g deionized water. After raising the agitation rate to 500 rpm and increasing the temperature to 44° C., 165.4 g tert-butyl alcohol is added to the kettle.

After again increasing the temperature of the contents of the kettle to 44° C., an aqueous solution of potassium hexacyanocobaltate (14.8 g) in water (232.0 g) is added using a syringe pump at a rate of 4.94 g/min.

Separately, a 500 ml glass beaker is charged with 193.0 g deionized water. While stirring the beaker contents with a stir bar, 160.18 g calcium chloride dihydrate is added gradually. The temperature is increased to 54° C., then 0.6 g calcium oxide is added all at once. The beaker is heated to 60° C. while covered until all of the calcium oxide goes into solution, then stirred for another 20 minutes while cooling to 53° C.

The calcium chloride/calcium oxide solution is added to the kettle using a syringe pump at an addition rate of 2.94 g/min. Once addition is completed (100 minutes), mixing is continued for another 20 minutes at 50° C.

A solution of 15.88 g 1000 molecular weight polypropylene glycol diol, 4.00 g tert-butyl alcohol and 62.2 g deionized water is thereafter added to the kettle contents. After mixing briefly, the kettle contents are filtered through 5 micron filter paper (20 psig $N_2$). The filter cake thus obtained is resuspended in a solution of 101 g tert-butyl alcohol and 55 g deionized water and stirred for 10 minutes before transferring to a 1 L round bottom flask and mixing at 300 rpm while heating to 50° C. After 60 minutes, 2.03 g 1000 molecular weight polypropylene glycol diol is added to the flask and mixed briefly before refiltering through 5 micron filter paper (20 psig $N_2$). The resulting filter cake (33.6 g) is resuspended in 144.0 g tert-butyl alcohol and mixed for 10 minutes before transferring to a 1 L round bottom flask. The suspension was heated at 50° C. for 65 minutes while stirring at 300 rpm. After adding 1.01 g of the polypropylene glycol diol and mixing briefly, the suspension is refiltered (5 micron filter paper, 20 psig $N_2$). The filter cake is dried overnight in a 550 vacuum oven to yield 12.3 g of the final calcium chloride-modified zinc hexacyanocobaltate complex catalyst. The elemental composition of the catalyst by analysis is 24.4 wt % Zn, 11.40 wt % Co, 2.80 wt % Cl and 0.62 wt % Ca.

Example 3

This example demonstrates the polymerization of propylene oxide using the calcium chloride-modified zinc hexacyanocobaltate complex catalyst prepared in Example 1. The polymerization is performed by charging 680 g of a propoxylated glycerin starter (hydroxyl number =240 mg KOH/g) and 0.071 g of the catalyst to a stirred pressure reactor, heating to 130° C. under a nitrogen blanket, and adding a total of 5029 g propylene oxide at an average feed rate of 20.3 g/minute over about 4 hours. The final concentration of catalyst is 12.4 ppm. The apparent rate of reaction ($K_{app}$) is 1.19. The polyether polyol triol thereby obtained has a hydroxy number of 27.9 mg KOH/g, an unsaturation level of 0.0081 meq/g, and a viscosity of 1600 cst at 25° C.

Example 4

The polymerization of Example 3 is repeated, but using 0.143 g (25.0 ppm final catalyst concentration) of the calcium chloride-modified zinc hexacyanocobaltate complex catalyst prepared in Example 2. A total of 5030 g propylene oxide is added at an average feed rate of 19.2 g/min over about 4.5 hours to obtain a polyether polyol triol having a hydroxyl number of 27.9 mg KOH/g, an unsaturation level of 0.0045 meq/g, and a viscosity of 1509 cst at 25° C. The apparent rate ($K_{app}$) is 1.779 $min^{-1}$.

Example 5

The procedure of Example 4 is repeated, but using 0.071 g catalyst (final catalyst concentration=12.4 ppm). A total of 5031 g propylene oxide is added over 4 hours at an average feed rate of 21.5 g/minute to obtain a polyether polyol triol having an hydroxyl number of 27.9 mg KOH/g, a viscosity of 1746 cst at 25° C. and an unsaturation value of 0.0063 meq/g. The apparent rate ($K_{app}$) is 1.210 $min^{-1}$.

I claim:

1. A double metal cyanide complex catalyst comprised of double metal cyanide and an organic complexing agent, wherein said double metal cyanide complex catalyst is modified with a Group IIA compound which is free of cyanide.

2. The double metal cyanide complex catalyst of claim 1 wherein said double metal cyanide is zinc hexacyanocobaltate.

3. The double cyanide complex catalyst of claim 1 wherein the organic complexing agent is selected from the group consisting of ethers, alcohols and mixtures thereof.

4. The double metal cyanide complex catalyst of claim 1 wherein the Group IIA compound is a calcium compound.

5. The double metal cyanide complex catalyst of claim 1 wherein the Group IIA compound is a halide compound.

6. The double metal cyanide complex catalyst of claim 1 wherein the Group IIA compound is a calcium halide compound.

7. The double metal cyanide complex catalyst of claim 1 wherein said double metal cyanide complex catalyst is comprised of 0.1 to 10 weight percent of a Group IIA element.

8. A zinc hexacyanocobaltate complex catalyst comprised of zinc hexacyanocobaltate and an organic complexing agent selected from the group consisting of alcohol, ethers and mixtures thereof, wherein said zinc hexacyanocobaltate complex catalyst is modified with calcium chloride in an amount corresponding to 0.1 to 10 weight percent calcium.

9. The zinc hexacyanocobaltate complex catalyst of claim 8 wherein the organic complexing agent is a water soluble aliphatic alcohol.

10. The zinc hexacyanocobaltate complex catalyst of claim 8 wherein the zinc hexacyanocobaltate complex catalyst is additionally comprised of a polyether polyol.

11. A method of making a zinc hexacyanocobaltate complex catalyst comprising reacting a zinc salt with a metal cyanide salt in the presence of a Group IIA compound which is free of cyanide.

12. The method of claim 11 wherein the zinc salt is selected from the group consisting of zinc halides, zinc nitrate, zinc sulfate and mixtures thereof.

13. The method of claim 11 wherein the metal cyanide salt has an anion selected from the group consisting of hexacyanocobaltate, hexacyanoferrate and hexacyanoiridate and a cation selected from the group consisting of sodium and potassium.

14. The method of claim 11 wherein the Group IIA compound is an calcium compound.

15. The method of claim 11 wherein the Group IIA compound is a halide compound.

16. The method of claim 11 wherein the Group IIA compound is a calcium halide compound.

17. The method of claim 11 wherein an organic complexing agent is additionally present.

18. The method of claim 11 wherein an amount of the zinc salt is used which is stoichiometric or less relative to the amount of metal cyanide salt used.

19. A method of making a zinc hexacyanocobaltate complex catalyst comprising reacting a zinc halide with potassium hexacyanocobaltate in an aqueous medium in the presence of a calcium halide and an organic complexing agent, wherein the zinc halide salt is used in an amount which is stoichiometric or less relative to the amount of potassium hexacyanocobaltate used.

20. The method of claim 19 wherein the zinc halide is zinc chloride, the calcium halide is calcium chloride and the organic complexing agent is selected from the group consisting of alcohols, ethers and mixtures thereof.

* * * * *